Sept. 14, 1948.  H. PFLEUMER  2,449,316
CANNING JAR
Filed Dec. 22, 1945
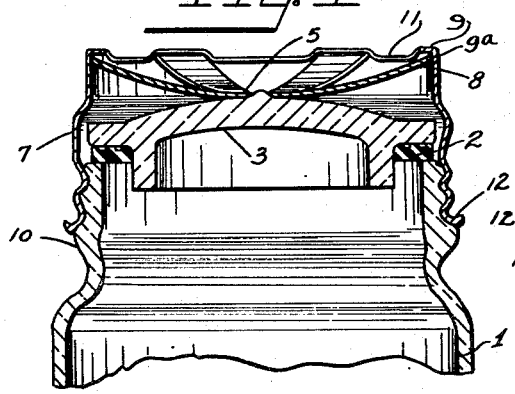
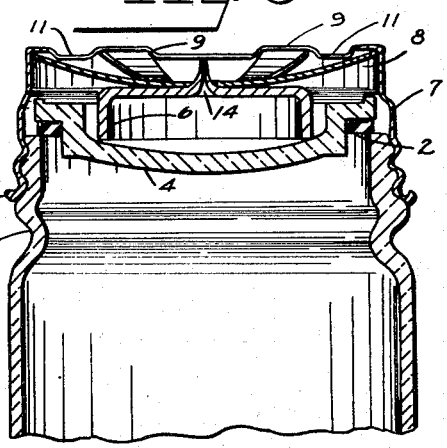
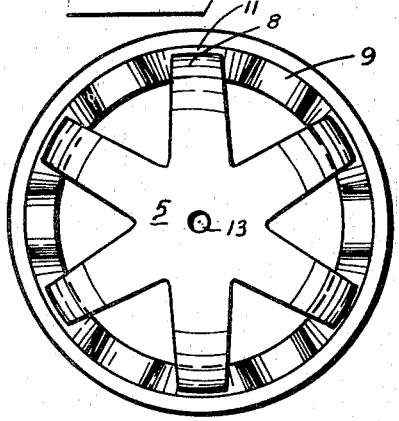
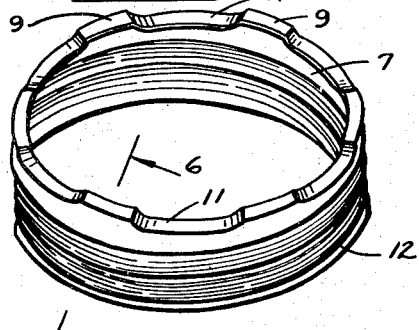
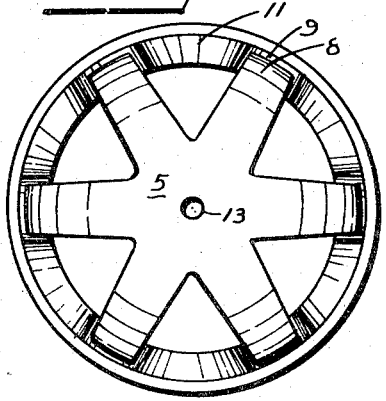
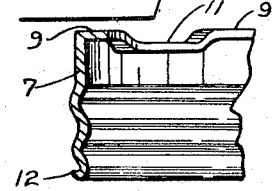
INVENTOR.
HANS PFLEUMER
BY
Ostrolenk + Faber
ATTORNEYS Patented Sept. 14, 1948

2,449,316

UNITED STATES PATENT OFFICE 2,449,316

CANNING JAR

Hans Pfleumer, New Brunswick, N. J.

Application December 22, 1945, Serial No. 636,669

2 Claims. (Cl. 215—56)

My invention relates to home canning and in particular to a closure for the well-known Mason type jars with glass tops, and more particularly to the use of a special screw band and compression spring during the processing to act as a safety valve and as a means to process without loss of juices and vitamins by leakage.

In commercial canning, tin cans are filled then hermetically sealed by soldering and then processed in live steam. During this heating period, the contents of the can partake of the temperature surrounding it and when removed from the pressure vessel, the can swells up somewhat owing to the internal pressure of the contents. However, after the can has cooled it has shrunk to normal size. No liquid and no vitamins can get lost and the process would be ideal but for the fact that it is not suitable for home canning. Tin cans may also in time corrode from without.

Home canning depends upon a Mason type jar which must be only partially sealed up during processing and which is afterwards permanently sealed by virtue of a partial vacuum. If it were not for the partial sealing, no partial vacuum could be obtained within the jar. The seal, therefore, is due to a loss of jar contents, e. g. the atmospheric air lying on top.

There are several modern methods used for sealing the jar, one employing metal tops with a plastic gasket and the other glass or porcelain tops with an elastic rubber ring.

My invention is directed to the latter and is especially useful in connection with hot oven and pressure cooking, allowing both higher temperatures and shorter cycles. Also, a glass jar with rubber ring and glass top provides the most appealing, sanitary and permanent result.

Glass top closures as commonly used have several serious shortcomings which may be enumerated as follows:

(1) It is uncertain to which degree the screw band is tightened up before processing by the individual. Instructions call for: "screw band tight then loosen slightly," or: "tighten firmly," "smartly," etc., "then back up ⅛ turn" or "¼ turn," etc. Human hands exert varying force; there is no standard strength.

(2) The screw bands are a poor fit and are liable at any time to be at an abnormal angle to the jar; they are liable to strip during the tightening of the processed and hot jar causing leaks and injury.

(3) The screw bands need frequent replacement.

(4) The rubber ring may be compressed unevenly because the screw band does not locate itself at a normal angle to the jar.

(5) Juices and vitamins may be syphoned out of the jar during processing and shortly thereafter.

(6) The structure of the jar contents may be destroyed; young vegetable or fruit may explode within the jar and the contents keep boiling under the reduced pressure of an extreme vacuum.

(7) By the syphoning action particles may be deposited under the rubber ring causing eventual failure of the seal.

(8) The public generally is warned not to use glass tops for oven canning as the jars may explode and cause injury.

The processing cycle with a pressure cooker is as follows: The cold or hot jar is placed upon a low rack in the pressure cooker which contains a small amount of water to raise steam. The rest of the volume is air which must be exhausted. When the pot has been sealed, external heat is applied to it to generate steam. It is essential to let the steam blow off about 5 minutes to rid the vessel of all air which otherwise when compressed by the steam would give an erroneous translation of observed gage pressure into temperature. During the active heating by the live steam, the jar and its contents partake of the surrounding temperature—although lagging behind somewhat in time—and the contents, thereby, expand volumetrically causing a scavenging of the airspace in the jar.

When the heating period is finished, the steam is permitted to die down (not drawn off immediately) in order to give the jar time to adjust itself to the lowered pressure and temperature. However, the jar lags behind again in giving off its heat. Consequently, during the die-down period, the pressure in the jar is being constantly released equalizing the pressure differential through the partially sealed closure of the jar and thereby the contents of the jar is caused to be syphoned out. If the jar were sealed absolutely tight to prevent this, there would be a distinct possibility that the glass jar would be stressed beyond its tensile strength and would explode within the cooker.

This condition is sometimes aggravated as follows: The normal procedure is to let the steam die down to zero (as read on the pressure gage) then open the pet cock (to make certain all pressure is gone) and then to remove the lid of the cooker. Before the heating period all air was expelled by letting the steam blow off, therefore, when during the die-down the steam is condensed to water and the gage zero mark is reached a vacuum will be built up in the pressure cooker. I have noticed (using a vacuum-pressure gage) that in a short time (15-20 minutes) 15 to 20" Hg may be the result. This being equal to about 7.5 to 10 pounds p. s. i. negative pressure increased the pressure differential between the jar and the vessel interior still more causing a still greater syphoning action. It is easy to see that the home canner may—to play safe with the pressure—let the cooker die down too long and create a vacuum with the destructive consequences as pointed out.

With hot oven processing whereby a uniform heating is more difficult, any estimate of the internal jar pressure is uncertain; a jar may have been sealed too tight and placed in the hottest spot in the oven and this combination may effect as explosion when the jar screw band is finally tightened.

My invention overcomes all these difficulties inasmuch as its action is automatic, the device is easy to handle preventing accidents, can be used for any kind of canning including oven and pressure cooker processing and insures a full Mason type jar without leaks, no broken up texture, no loss of vitamins and speeds up the cycles. It is of permanent construction and needs no replacement once bought.

The primary object of my invention, therefore, is the provision of a novel closure for a Mason type jar, which closure will permit pressure processing while at the same time ensuring a continuous and permanent seal.

Another object of my invention is the provision of resilient means for maintaining the closure of a Mason type jar in position during processing.

Still another object of my invention is the provision of resilient means to permit the cover of a Mason type jar to move outwardly during processing to permit equalization of internal and external pressure while at the same time holding the cover firmly in place.

These and many other objects of my invention will become apparent in the following description and drawings in which:

Figure 1 is a cross-sectional view through a jar including my novel cover securing member.

Figure 2 is a plan view of the leaf spring spider used in the cover securing structure of Figure 1.

Figure 3 is a view in perspective of the removable securing ring for the cover securing structure of Figure 1.

Figure 4 is a view corresponding to that of Figure 2 indicating another position of the spring spider.

Figure 5 is a view showing the application of my novel cover securing structure to a recessed cover.

Figure 6 is a cross-sectional view taken on line 6—6 of Figure 3 looking in the direction of the arrows.

Referring now to Figures 1 to 4 and 6, the Mason type jar 1 is provided with an upper screw thread adjacent the upper opening terminating at the annular shoulder 10. The cover 3 which is preferably of glass is provided with an annular gasket 2. The cover 3 is held in place on the fully processed jar by the partial internal vacuum within the jar.

Means, however, must be provided for holding the cover in place on the jar during processing. Heretofore, such means have including a flanged screw-on top which was first tightened and then loosened slightly to permit the cover to move a little away from its seat to permit external and internal pressures to equalize during processing. This has provided a loose cover without a positive closure and leading to the many disadvantages previously discussed.

The screw band 7 of my invention is provided with a shoulder 12 which is tightened against the shoulder 10 of the Mason type jar 1. The neck of the Mason jar 1 and the screw band 7 are correspondingly threaded for this purpose.

The screw band 7 is thus positively positioned by the meeting shoulders 10 and 12 and cannot be tightened further. This provides a standard clearance between the glass top and the screw band flange. The shouldering of the band provides a normal angle between all three parts. This insures a uniform compression of the rubber gasket. Between the jar top edge and the underside of the glass top 3 the rubber ring 2 is located, the clearance between the glass top and the screw band flange 9 is taken up by a compressible spring steel spider 5 having spring legs 8 which exerts a downward pressure centrally upon the glass top. The spider 5 may for illustration be six-legged which I have found to provide a good balance. The spider 5 is convexly bent, the convex side resting upon the upper surface of the glass top and the legs engaging the flange 9a of the screw band. If, therefore, the screw band is tightened down to bottom against the jar shoulder 10 the central portion of the spider 5 pushes the glass top 3 evenly downwards compressing the rubber gasket 2 evenly. The tension of the spider 5 is designed to counteract the pressure differential during the blowing off period but is insufficient to prevent a partial scavenging during the thermal expansion of the jar contents. Even, should the jar be filled completely (which is not advisable with common closures) the glass top would pop open preventing an explosion of the jar. The preferred airspace above the jar contents is ½" for pints and 1" for quarts and the force of the thermally expanding contents is sufficient to drive a substantial part of the top air out; this force is irresistible since liquid is, to all practical purposes, incompressible. The air is driven out against the spring pressure.

When processing under 5 pounds p. s. i. steam pressure the thrust against the glass top immediately after the complete reduction to atmospheric pressure is 24.5 pounds, for 10 pound processing 49 pounds and for 15 pound processing 73.5 pounds. The same is true for hot oven processing wherein the respective temperatures employed are equivalent to the corresponding jar pressures. Now, therefore, my novel device provides for varying tension on the spring spider 5 to do the expected work. That is to say for processing in hot water bath and up to 5 pounds steam pressure I flatten the spring spider less and for processing at 10 to 15 pounds steam pressure I flatten the spring spider more providing increased counter-pressure. This is done with the same spring spider and the same band.

In common steam pressure processing the steam pressure is allowed to die down slowly after completion of the pressure cycle. If the steam were blown off quickly the reduced pressure outside the jar would syphon out the jar liquid. This dying down process with a large size pressure cooker holding 7 quarts or 16 pints takes a considerable time. It is, however, advisable once the processing cycle is completed to hasten the cooling off of the jars' content to prevent further softening thereof. With my device the steam can be blown off gently and immediately, no wait being necessary.

The figures illustrate a six-legged spider 5, although fewer legs or more are possible. While Mason type jars are all of standard dimensions, the glass and porcelain tops differ somewhat in design and height, but my closure is flexible enough to take care of these differences.

The top flange 9a of the screw band 7 is actually a compound unit having higher portions 9 and lower portions 11 each set 30° in extent (where a six-legged spider 5 is used). When the legs 8 of the spider 5 are beneath portions 9 of the flange relatively low pressure on cover 3 is obtained. When legs 8 are under the lower portions 11 of the flange, then relative higher pressure on cover 3 is obtained.

In Figure 1, the spider is compressed for low processing pressures, e. g. 212° F. to 227° F. (5# p. s. i.) Figure 4 also shows how the legs 8 are engaged by the recesses 9. Figure 3 shows perspectively the screw band 7 with the rim 12, the recesses 9 and the intermediate flat portions 11 of the flange. In Figure 2 the spider is turned around 30 degrees to engage these flat portions and thereby to increase the spring pressure to conform to processing pressures between 10 to 15 pounds p. s. i. (240 to 250° F.).

Where, as in Figure 5, a countersunk top 4 is used, a hollow pad 6 is provided between the top 4 and the spider 5, the point 14 of the pad 6 registering in the small opening 13 of the spider 5 to position it.

In either case, the screw band 7 is tightened and the spring pressure is regulated by the portions 9 or the portions 11 of the screw band 7. Due to the friction therebetween, the spider will remain seated with its legs against the flat portions while being turned bearing concentrically against the glass top or pad.

With prior methods of processing it is advisable to wait 12 to 24 hours before the screw band may be removed. The reason is that with the common bands a peripheral friction exists between the glass top and the screw band which may loosen the glass top and break the seal. With my novel device the friction is only minor and concentrically exerted; it has, therefore, no effect upon the glass top. The screw bands may, consequently, be removed one or two hours after lifting the jars out of the vessel and when the contents have sufficiently cooled off to cause a partial vacuum. The screw bands, spring spiders and hollow pads may then be used over again.

The spring spider exerts a permanent elastic push causing a better compression of the rubber gasket and in a more uniform manner because of the concentric thrust.

With my improved process the fruit or vegetable in the jar remains in a perfect condition; the cuts remain sharp and spherical fruit such as peas, cherries or grapes do not explode; and foods such as beans do not suffer by afterboiling. This is, of course, due to the counterpressure which prevents any rapid expansion to atmospheric or lesser pressure.

The screw bands 7 may be made out of indefinite lengths of stainless steel band stock, by rolling it spirally into a coil of proper diameter. Thereafter, the individual bands may be cut to give the proper circumference, straightened up and butt-welded after which the Mason thread and the recesses are pressed in. Stainless steel is to be preferred because of its superior strength and permanency.

It is self-evident that the screw bands once tightened need no further attention during the processing, whereas the necessity for adjusting the screw band in the prior art made the prior process uncertain and unsafe.

In the foregoing, I have described my invention solely in connection with a preferred embodiment thereof. Since many variations and modifications of my invention will now be obvious to those skilled in the art, I prefer to be bound not by the specific disclosures herein but only by the appended claims.

I claim:

1. In combination, a jar having an opening, a cover for the jar, a gasket between the cover and the material of the jar defining the opening therein, and resilient means for maintaining the cover in place; said resilient means comprising an auxiliary member securable to the jar above the cover thereof, and a spring between the auxiliary member and the cover; said auxiliary member having an annular flange substantially parallel to the cover; said spring comprising a substantially convex sheet of spring material having a central portion engaging the upper surface of the cover, and having radiating legs engaging the under surface of said annular flange; said flange including means for regulating the pressure of the spring on the cover; said means comprising the arrangement of the flange to have a series of spaced stepped elements at different levels above the cover; the number of spaced elements at each step corresponding to the number of radiating legs of the convex sheet.

2. In combination, a jar having an opening, a cover for the jar, a gasket between the cover and the material of the jar defining the opening therein, and resilient means for maintaining the cover in place; said resilient means comprising an auxiliary member securable to the jar above the cover thereof, and a spring between the auxiliary member and the cover; said auxiliary member having an annular flange substantially parallel to the cover; said spring comprising a substantially convex sheet of spring material having a central portion engaging the upper surface of the cover, and having radiating legs engaging the under surface of said annular flange; said flange including means for regulating the pressure of the spring on the cover; said means comprising the arrangement of the flange to have a series of spaced stepped elements at different levels above the cover; the number of spaced elements at each step corresponding to the number of radiating legs of the convex sheet; said convex spring sheet exerting greater pressure when the radiating legs thereof engage beneath the lower elements of the flange and lesser pressure when the legs thereof engage beneath the higher elements of the flange.

HANS PFLEUMER.

REFERENCES CITED

The following references are of record in the file of this patent:

UNITED STATES PATENTS

| Number | Name | Date |
| --- | --- | --- |
| 727,808 | Knowlton | May 12, 1903 |
| 973,512 | Keeran | Oct. 25, 1910 |
| 1,002,963 | Bostwick | Sept. 12, 1911 |
| 1,182,917 | Lotz | May 16, 1916 |
| 1,459,558 | Stark | June 19, 1923 |
| 2,011,140 | Berglund | Aug. 13, 1935 |

FOREIGN PATENTS

| Number | Country | Date |
| --- | --- | --- |
| 34,456 | Switzerland | June 26, 1905 |
| 320,112 | Great Britain | Oct. 7, 1929 |
| 142,647 | Austria | Aug. 26, 1935 |